United States Patent [19]

Williams et al.

[11] 4,301,137

[45] Nov. 17, 1981

[54] REMOVAL OF CHLORINE FROM PYROLYSIS VAPORS

[75] Inventors: Kenneth A. Williams; Hans F. Bauer, both of Diamond Bar, Calif.

[73] Assignee: Occidental Research Corporation, Irvine, Calif.

[21] Appl. No.: 36,887

[22] Filed: May 7, 1979

Related U.S. Application Data

[63] Continuation of Ser. No. 862,686, Dec. 21, 1977, abandoned.

[51] Int. Cl.³ .......................... C01B 7/00; C01F 5/26; C01F 11/20; B01J 37/00
[52] U.S. Cl. .................................. 423/481; 201/2.5; 201/29; 252/420; 423/240; 423/497; 423/DIG. 15; 423/DIG. 18; 585/240
[58] Field of Search ............... 423/481, 497, 240, 178, 423/DIG. 15, 169, 240 S, DIG. 18; 201/2.5, 4, 25, 29; 252/420; 585/240

[56] References Cited

U.S. PATENT DOCUMENTS

| | | | |
|---|---|---|---|
| 2,137,675 | 11/1938 | MacIntire | 423/497 |
| 2,487,497 | 11/1949 | Vettel | 423/169 |
| 2,919,174 | 12/1959 | Pring | 423/240 |
| 3,131,027 | 4/1964 | Borkowski et al. | 423/240 |
| 3,481,702 | 12/1969 | Moore et al. | 423/169 |
| 3,829,558 | 8/1974 | Banks et al. | 423/481 |
| 3,933,978 | 1/1976 | Margraf | 423/240 |
| 3,935,297 | 1/1976 | La Hue et al. | 423/240 |

FOREIGN PATENT DOCUMENTS

| | | | |
|---|---|---|---|
| 531575 | 10/1956 | Canada | 423/240 |
| 2252710 | 5/1974 | Fed. Rep. of Germany | 423/240 |
| 2411994 | 9/1975 | Fed. Rep. of Germany | 423/240 |
| 2205354 | 6/1972 | France | 423/240 |

OTHER PUBLICATIONS

Jonos, Jerry, Converting Solid Wastes & Residues to Fuel, Chemical Engineering, 20 Jan. 1978 pp. 87-94.
Mellor, A Comprehensive Treatise on Inorganic & Theoretical Chemistry, vol. II, p. 217 Longmans, Green and Co., NY NY 1922.

*Primary Examiner*—Gary P. Straub

[57] ABSTRACT

The gas stream obtained from the pyrolysis of solid organic wastes and containing halogens, particularly chlorine in the form of the corresponding hydrogen halide is processed to obtain a halide free pyrolytic oil. The gas stream after solids removal is contacted with a solid metal halide acceptor above the dew point of pyrolyzate to form the corresponding metal halide which may be discarded. As an alternative the metal halide can be treated to release the hydrogen halide which is recovered as an acid and the acceptor regenerated for recycle. The preferred acceptor is calcium carbonate.

7 Claims, 1 Drawing Figure

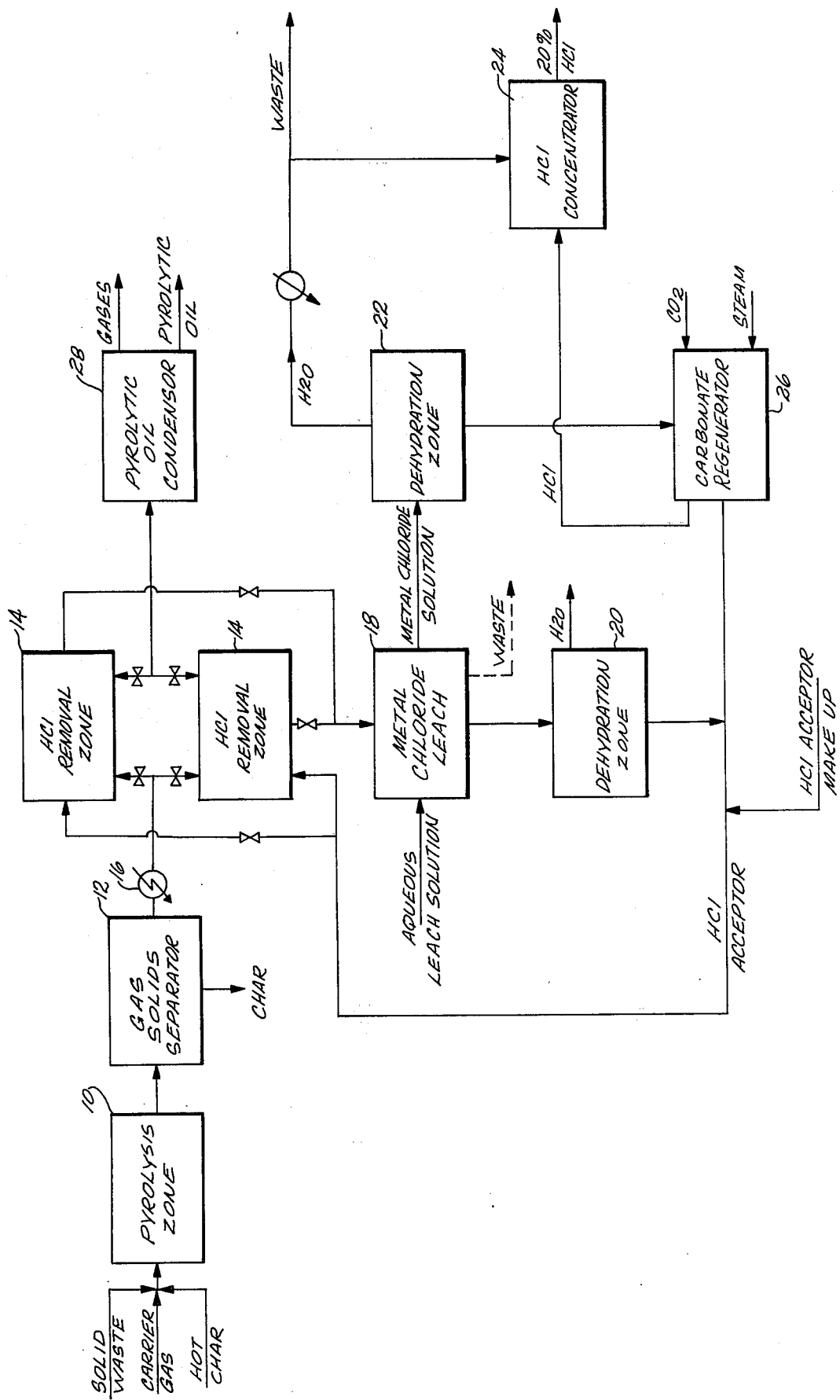

REMOVAL OF CHLORINE FROM PYROLYSIS VAPORS

This is a continuation of application Ser. No. 862,686 filed Dec. 21, 1977 now abandoned.

BACKGROUND OF THE INVENTION

The present invention is directed to the pyrolysis of solid organic wastes from industrial and municipal sources and to obtaining a halide free pyrolytic oil therefrom.

The disposal of wastes both from municipal and industrial sources, such as trash, rubbish, garbage, animal wastes, agricultural wastes, and waste of plastic processing operations is rapidly becoming of immense national concern. The cost of disposal ranks third behind public schooling and highways as municipal expense in the United States.

It is estimated that each individual in the country generates between 4 and 6 pounds of waste per day, that the industrial output is equivalent to approximately 5 pounds of solid waste per person per day. Previous methods of mass waste disposal, such as landfill are becoming impossible, while others such as incineration are costly and result in air pollution problems.

A vast majority of the waste which is presently disposed of contains products which are immediately recyclable back into the economy or products into which the waste can be converted for recycle back to the economy. Directly recyclable constituents are the various metals present, such as aluminum and steel, and glass. For the most part, the organic fraction of the waste is subject to a flash pyrolysis operation following recovery of the directly recyclable inorganic fraction. Flash pyrolysis yields a carbon containing solid residue of pyrolysis and a pyrolytic oil as products.

A particularly attractive method for converting the solid organic wastes into new and useful products consists of a process where the waste material is first dried and comminuted to a particle size wherein the largest particle has a maximum particle dimension of less than about 1 inch. There is then formed a turbulent gas stream by admixing the dried comminuted waste material with a solid source of heat and a carrier gas which does not deleteriously react with or oxidize the organic waste materials or products derived therefrom. The mixture is passed through a flash pyrolysis zone where at a temperature between 600 and 2000° F. the organic waste undergo flash pyrolysis yielding a carbon containing solid residue of pyrolysis and a vaporized hydrocarbon constituent. The vaporized hydrocarbon constituent is separable as a pyrolytic oil and a normally gaseous hydrocarbon constituent which may be recycled to the process and, for instance, combusted to heat the solid source of heat or utilized because of its olefin content. A portion of the carbon containing solid residue of pyrolysis is normally recycled to provide the solid source of heat.

The pyrolytic oils formed while varying in nature depending upon the compositions of the waste material processed and pyrolysis conditions employed are at the same time unique. They may be characterized as an oxygenated, complex organic fluid, typically up to 40% soluble in water or acids, and almost completely soluble in bases. Solubility in polar organic solvents such as dimethyl formamide or dimethyl sulfoxide is high and the pyrolytic oils are relatively insoluble in non-polar organic solvents, such as diesel oil, carbon tetrachloride, pentane, decane, benzene, toluene and hexane. The pyrolysis oil, however, can be successively blended and mixed with various fuel oils, although it is not miscible with such fuel oils. Combustion stability of the mixture is about the same as #6 fuel oil alone.

A typical example of an elemental analysis of the pyrolytic oil is that obtained from the pyrolysis of a waste material containing about 70% cellulosics. The oil thus obtained will contain from about 52 to about 50% carbon, from about 6 to about 8% hydrogen, from about 1 to about 2% nitrogen and from about 29 to about 33% oxygen. The empirical formula which best fits the pyrolytic oil analysis is $C_5H_8O_2$. Specific gravities are unusually high, ranging from about 1.5 to about 1.4.

Municipal and industrial wastes can contain various quantities of halides, the most conspicuous of which is chlorine. Chlorine sources range from plastics such as polyvinyl chloride to animal feed lot wastes. One municipality has estimated that the chlorine content of trash will range from 0.7 to about 1.8% by weight, with a mean estimate of 1.3%. Considering a 500 ton per day plant processing municipal waste, the potential hydrogen chloride output on the plant amounts to 6.7 tons per day.

Not only are the hydrogen halides such as hydrogen chloride worth recovering as the corresponding acid, they present problems of corrosion and secondary disposal problems from a pollution standpoint which must be coped with.

At the same time, hydrogen halides cannot be recovered as a component of the pyrolytic oil, since one of the principal end uses for the pyrolytic oil is as a fuel oil. Understandably, it would be desirable to have the vent gases from the combustion of the fuel essentially free of hydrogen halides from both a corrosion and pollution standpoint.

SUMMARY OF THE INVENTION

According to the present invention there is provided a process for the removal of hydrogen halides, particularly hydrogen chloride, from gas streams generated in the pyrolysis of solid organic wastes.

The process of the invention, in particular, is directed to an operation wherein a solid organic waste is comminuted to a particle size sufficiently low to permit pyrolysis when mixed with a solid source of heat and passed with a carrier gas which is substantially non-deleteriously reactive with the products of pyrolysis through a flash pyrolysis zone where there is formed a carbon containing solid residue of pyrolysis, a condensable pyrolytic oil, water and normally gaseous hydrocarbon. Additional components to the effluent of the pyrolysis zone are the hydrogen halides, namely, hydrogen chloride and to the extent precursors are present, hydrogen fluoride, hydrogen bromide and hydrogen iodide.

In carrying out the process of the invention, the effluent from the pyrolysis zone is passed through a solids separation zone where product solid source of heat and carbon containing solid residue of pyrolysis are separated from the product stream.

The gas stream is then passed through one or more of the hydrogen halide removal zones containing a solid metal halide acceptor, which reacts with the hydrogen halides present to yield the corresponding water soluble metal halide. The metal halide acceptor employed is selected to be reactive at the contact temperature which range from the dew point of constituents in the gas stream to about the exit temperature from the pyrolysis zone, preferably from about 400 to about 1600° F. It is also essential that the corresponding metal halide will not hydrolyze at the temperatures employed in the presence of moisture which is a typical constituent of the pyrolysis products, but will be water soluble at reduced temperatures.

The reactive metal compound can be an oxide, hydroxide, carbonate or bicarbonate. An alkali metal and calcium compounds, such as sodium carbonate, potassium carbonate, sodium bicarbonate, potassium bicarbonate, calcium oxide, calcium hydroxide, calcium bicarbonate, calcium carbonate and the like are preferred, as they are regenerative. Iron, barium and strontium compounds may also be used.

The hydrogen halide removal zone contains, as indicated, the metal chlorine acceptor preferably in the solid state. To maintain a low hindrance to gas flow, it may be in the form of a fluidized mass of the fixed bed, or as a porous matrix. Melts may also be used with a concomitant increase in resistance to flow.

Naturally occurring minerals in which the exposed metal halide acceptor is on the surface of the material may conveniently be used. Examples are dolomite, aragonite and calcite. Dolomite is an intimate mixture of calcium carbonate and magnesium carbonate which can be made highly reactive by heating to partially release carbon dioxide. This can occur by initial contact with the vapor stream following char separation. While both the magnesium oxide and calcium oxide or calcium carbonate present in the calcined dolomite are reactive with respect to hydrogen chloride, the magnesium oxide will hydrolyze. Accordingly, the only functional species is calcium carbonate or oxide. Dolomite is a preferred natural material, as it can be transformed into an open or porous matrix affording maximum utilization of the calcium per pass.

The gas stream following removal of chlorine is passed to a condensation zone where the pyrolytic oils are separated by cooling and recovery. The off gases which have a nominal heating value of about 250 BTU's or more are typically recycled back to serve as the solid source of heat for recycle back to the pyrolysis zone.

More expeditiously and independent of its initial source, the metal halide acceptor may be continuously regenerated for reuse in the process. Once spent, as indicated by a reduced capacity to extract the hydrogen halides from the pyrolysis vapors, the solid acceptors are treated for regeneration. When this occurs an alternate hydrogen halide acceptor zone is placed into service.

Independent of the metal halide acceptor employed, for all intents and purposes, only a relatively small portion of the mass of the metal halide acceptor will react with available hydrogen halide, this occurring at the surface of the acceptor. The corresponding metal halides formed are, however, water soluble. The spent acceptor is removed from the hydrogen halide removal zone and leached to wash the metal halides from the surface. The composition of the leach solution can be controlled to prevent solution of constituents other than the metal halides. This will rejuvenate the surface of the metal halide acceptor which is recycled back to the hydrogen halide removal zone. Excess leach solution present in the rejuvenated acceptor may be removed in a dehydration zone or in situ in the hydrogen halide removal zone.

Although the leached metal halide salts may be discarded to waste or recovered as such, or converted to other metal salts, it is preferred to process the metal halide to a state suitable for acceptance of additional hydrogen halide. This may be accomplished, in the case of calcium, for instance, by passing the leach solution to a dehydration zone where moisture and some hydrogen halide are separated in the vapor phase, and condensed as a weak acid solution. The dehydrated solid residue is then passed to a regeneration zone where in contact with steam and carbon dioxide at elevated temperatures and pressures, the halide is replaced on the metal by the carbonate and/or the bicarbonate radical. This releases hydrogen halides which are combined with the water removed in the dehydration zone to form an acid of any strength, preferably 20 percent acid as a separate product of commerce. The predominant constituent being hydrogen chloride, the product acid may be regarded as hydrochloric acid. The hydrogen halide acceptor which has been regenerated is then recycled back to the hydrogen halide removal zone.

A modified LeBlanc process may also be used.

By the practice of the process of this invention, hydrogen halides generated in substantial quantities in the process of municipal waste can be recovered as a useful end product such as hydrochloric acid or safely treated for disposal.

THE DRAWING

The attached Drawing is a schematic illustration of one technique for carrying out the process of this invention.

DESCRIPTION

According to the present invention, there is provided improvements in processes for the pyrolysis of solid organic waste to separate hydrogen halides from the pyrolysis products.

The processes to which the invention is adapted generally consists of processing and as received solid waste for separation into a generally inorganic fraction containing recyclable values and a solid organic waste fraction for pyrolysis. The solid organic waste fraction to undergo pyrolysis can be the entire portion of the waste or the residue resulting from processing for recovery of recyclable organic values, as for instance, by the pulping of the cellulosic fraction of the solid waste to form paper pulp.

The pyrolysis process employed is preferably flash pyrolysis where the organic portion of the municipal waste is dried and comminuted to provide particles having a maximum dimension of about 1 inch, and preferably the particles have a maximum dimension of 0.25 inch or less, more preferably with particle size less than 28 mesh. By the term, "maximum dimension" there is meant that the largest dimension, i.e. length, width or thickness of the individual particles, should not exceed this limit.

The individual particles may have smaller dimensions and consist of "chunks" which have three dimensions, paper stock, polymeric films, leaves which have two dimensions and filaments which essentially have only one dimension.

The solid organic waste undergoes pyrolysis and comes from a variety of municipal and industrial sources normally following recovery of recyclable inorganic fractions, such as metals and glass. As an alternative or in addition, it may be the organic residue of an initial pulping operation to recover paper pulp.

As used herein by the term "solid organic wastes", there is meant municipal and industrial wastes which contain cellulosic materials, plastics, rubber stock, and animal wastes. Included in the meaning of "cellulosic materials" are paper, tree bark, saw dust, crop wastes, vegetable and fruit wastes, vegetable and fruit processing wastes, tree trimming, and the like. "Plastics" include discarded household plastics as well as the waste of industrial polymer forming and processing operations. A particular hydrogen chloride contributing ingredient is polyvinyl chloride. "Rubber stock" includes waste tires from which the carbon filler can be recovered as recycle carbon filler. "Animal wastes" include household discards, slaughter house wastes, poultry processing wastes, manure and the like.

After comminution, if necessary, the solid organic waste fraction is typically dried to enable passage through a pyrolysis zone. As shown in the attached Drawing, it is then mixed with a carrier gas and a solid source of heat which is a carbon containing solid residue of pyrolysis and/or the inorganic residue obtained by decarbonization of the carbon containing solid residue of pyrolysis. The constituents of the latter include fine glass and metal particles which elude separation of inorganics from the organics contained in the solid waste. The mixtures passed through a flash pyrolysis zone 10 under turbulent flow conditions where there is formed a carbon containing solid residue of pyrolysis termed herein "char". Pyrolysis preferably occurs at a temperature from 600 to 2000° F., more typically from 600° to 1400° F. The Reynolds number is in excess of 2000. Residence time for mixing and pyrolysis is less than about 1 minute, preferably less than about 10 seconds and more preferably from about 0.1 to about 2.0 seconds. The laminar flow conditions are to be avoided as it limits heat transfer within the pyroslysis zone.

A typical feed to a pyrolysis zone consists of about 0.2 to about 2 pounds of carrier per pound of solid organic waste. The carrier gas employed to transport the solid source of heat and the comminuted solid organic waste through the pyrolysis zone is one which will normally not deleteriously react with the products of pyrolysis. The gas stream can contain reactive constituents, however, such as carbon monoxide and hydrogen which will react with the hydrocarbons formed during pyrolysis to convert them to other useful hydrocarbons. A totally inert carrier gas such as nitrogen can also be used. What is avoided, however, is the introduction of free oxygen.

The heat required for pyrolysis is provided by the solid heat source which is obtained by partial oxidation of the char and/or indirect heating of the char by the products of combustion of hydrocarbon fuel including the off gases from the pyrolysis operation. Except for start-up, the char is typically a portion of the char produced in the process.

The effluent from the pyroslysis zone is composed of the solid heat source, char, a condensable pyrolytic oil which is used for its fuel or chemical values, hydrogen halides such as hydrogen chloride, hydrogen fluoride, hydrogen bromide and hydrogen iodide, water as steam, and other normally gaseous constituents which include the carrier gas and which has heat value. It can, depending on pyrolysis conditions, contain valuable olefin constituents. Of the hydrogen halides, the dominant constituent is hydrogen chloride.

By the term "pyrolytic oil" there is meant the normally condensable fluid as opposed to gaseous or free solid, i.e. char segment of the pyrolysis operation. It is typically highly oxygenated, but low in bound sulfur and the halogens. It is up to 40% soluble in water and acids and almost completely soluble in bases. Having a typical empirical formula of about $C_5H_8O_2$, It is relatively insoluble in non-polar organic solvents, blendable, but not miscible, with No. 6 fuel oil. Specific gravity is in excess of 1.0 usually from about 1.1 to about 1.4.

Following conversion in pyrolysis zone 10, the gaseous stream and solids are passed to gas-solids separator 12 typically a cyclone separator where the solid heat source and char are separated from the gas stream at a temperature above its dew point. By "dew point" there is meant the temperature at which some pyrolysis product(s) which are gaseous at the pyrolysis temperature will condense form the gas phase, either as a liquid, a semi-solid or solid. A portion of the char removed may be collected as product and the balance recycled back to the process for informal use of the solid heat source for pyrolysis zone 10. The gas is then passed to one or more hydrogen chloride removal zones 14.

As shown in the Drawing, two zones 14 are operated in parallel, one serving as a functional zone for hydrogen halide removal, while the other undergoes either replenishment or regeneration. As illustrated, suitable valving is employed to switch gas flow between the zones.

Hydrogen halide removal from the gas stream occurs in one of zones 14 at a temperature above the dew point of the gas stream. This is to preclude the solid absorbent used therein from becoming plugged due to the deposition of condensable substance in the gas stream which, if allowed to accumulate, would impede gas flow.

Depending upon the metal halide acceptor used, reaction occurs at a temperature range from about 400 to about 1600° F. To facilitate low temperature reactions where desired, the gas may be precooled in heat exchanger 16.

By a "metal halide acceptor", there is meant a metal compound which will react with the hydrogen halides, in general, and hydrogen chloride in particular, to form water soluble metal halide metal salts which are substantially solid and non-hydrolyzable at the temperature employed.

Typical of the metal chlorine acceptors are metal oxides, hydroxides, carbonates, and bicarbonates. The preferred metal compounds are the alkali metal and calcium compounds. Iron, barium and strontium compounds may also be used. A particularly preferred metal compound is calcium carbonate which can be regenerated.

A natural source of calcium which can serve as a metal halide acceptor is dolomite preferably in its half calcined state. Dolomite is a carbonate of calcium and magnesium which will readily release carbon dioxide upon the application of heat, particularly at temperatures at which hydrogen chloride is to be removed from the gas stream. It presents an open matrix having a high surface area available for reaction with the hydrogen halide. Other convenient naturally occurring sources of calcium carbonate are aragonite and calcite.

In dolomite, magnesium oxide or carbonate is also available for reaction with the hydrogen halides. The presence of water in the gas stream at reaction temperatures employed will, however, cause magnesium chloride to hydrolyze and release the hydrogen halides. It is, therefore, a passive substance.

As the metal halide acceptor, whether natural or artificial, react with the hydrogen halides, the active sites on the surface become occluded due to formation to the corresponding metal halides, such as for instance, calcium chloride. With time, therefore, the solid acceptor contained in the hydrogen halide removal zone 14 becomes spent, and the gas flow is switched to another bed.

Conservation of materials requires regeneration of the spent bed. This is preferably accomplished as shown in the Drawing external to the hydrogen halide removal zone 14, although in situ regeneration may also be conveniently practiced.

The Drawing illustrates a sequence of steps which may be performed to regenerate the metal halide acceptor, independent of whether they occur in the hydrogen halide removal zone 14 or external thereto.

The spent solids containing surface metal halides are removed and passed to a metal halide leach zone 18, where it is contacted with an aqueous solution at a temperature sufficient to remove the formed metal halides. The aqueous leach solution can be saturated with respect to other constituents of the acceptor to selectively dissolve the metal halides or if desired any one of them.

Once the surface has been washed of the formed metal halides, the regenerated hydrogen halide acceptor is then sent to dehydration zone 20 where any excess leach solution is removed by evaporation and the acceptor recycled back to the hydrogen halide removal zone. Since some loss will occur, make-up is normally required.

The aqueous solution of the metal halides formed may be discarded as waste or processed for their salt values.

The more desirable expedient, as illustrated in the Drawing, however, is to recover the metal halide acceptor by causing release of the contained halides as hydrogen halides.

With reference to the Drawing, the halide solution of metal halides may be passed to dehydration zone 22 where essentially all of the free water is driven off, condensed and cooled and discarded or collected as a weak acid in concentrator 24. The concentrated slurry of the salts is passed to regenerator 26. There at an elevated temperature and pressure and in contact with steam and carbon dioxide, the metal halides react to form the corresponding carbonate with attendant generation of hydrogen halides. The hydrogen halides are removed from regenerator 26 and passed to acid concentrator 24 where they are extracted from the gas stream by the water present to basically form concentrated but somewhat impure hydrochloric acid, e.g. 20% hydrochloric acid as a separate product of commerce.

To achieve regeneration, where the halide salt is calcium halide, temperatures in excess of 1100° F. are employed for a feed gas at a pressure of three atmospheres which contains carbon dioxide and steam. This results in a reverse reaction which leads to the formation of calcium carbonate and the hydrogen halides. A gas stream of approximately one-tenth atmosphere hydrogen halide is generated which is, as indicated above, recovered as the corresponding acid. From a practical pressure consideration, the maximum temperature to be employed during regeneration is between 1300° and 1400° F. The regenerated calcium carbonate is then recycled back to the hydrogen halide removal zone 14.

Where the raw material used, at least for initial removal of hydrogen halides, is a naturally occurring substance, such as dolomite, it is evident that with use the matrix will be destroyed, and the only effectively remaining substance will be calcium carbonate in a finely divided state.

This being the case, where a regeneration cycle is employed, it must be ultimately anticipated that fine particles will be used as opposed to a cohesive matrix for hydrogen halide removal. In this instance, it is preferable to operate the hydrogen halide removal zone 14 as a fluidized bed in which the acceptors are suspended as fluidized particles by the gas stream from the pyrolysis zone. As an alternative, there may be employed a moving bed reactor in which the hydrogen halide acceptor flows counter-current to the flow of the gas stream from the pyrolysis zone or as a stirred bed reactor again to prevent agglomeration and packing of particles. Melts may also be used.

The gases from the hydrogen chloride removal zone are then passed through a pyrolytic oil condenser 28 where the temperature of the gas stream is cooled further to permit condensation of the pyrolytic oils. Preferably, the gas stream is cooled below the dew point of water to form a mixture of water and pyrolytic oils which are mutually soluble to an extent sufficient for the water to serve as a diluent carrier to reduce the viscosity of the pyrolytic oil. As the condensed water is essentially free of the hydrogen halides, the mixture will be free of corrosive constituents.

The gas stream leaving the pyrolytic oil condenser may be recycled back to the process to heat the char required for pyrolysis.

As an alternative, there may be employed a modified LeBlanc process for regeneration. In this instance, the dissolved calcium halide is reacted with sulfuric acid or sulfurous acid to form insoluble calcium sulfate or sulfite with attendant generation of the halogen acids. The acid can be recovered as essentially constant boiling 20% hydrochloric acid by distillation. The calcium sulfate or sulfite is then fluxed with char at an elevated temperature to form calcium sulfide. Upon reaction with carbon dioxide, the calcium sulfide is converted to calcium carbonate with evolution of hydrogen sulfide. The hydrogen sulfide is oxidized to sulfur trioxide and recovered as sulfuric acid for reuse in the process.

By the practice of this invention the pyrolysis products may be recovered in a halide free state and the halide constituents discarded in an ecologically feasible manner or recovered as acid.

What is claimed is:

1. In a process for the pyrolysis of solid organic wastes which includes solid organic wastes which yield hydrogen chloride upon pyrolysis, and wherein dried, comminuted solid organic waste, a solid source of heat and a carrier gas which is nondeleteriously reactive with respect to pyrolysis products are combined and passed through a pyrolysis zone maintained at a temperature from about 600° to about 2000° F. to form pyrolysis products which comprise, the solid source of heat, a carbon containing solid residue of pyrolysis, pyrolysis gases comprising a condensable pyrolytic oil and a gaseous component comprising water, hydrogen chloride, and hydrocarbons, the method of recovering a pyrolytic oil and a gaseous residue substantially free of hydrogen chloride which comprises:

(a) separating the solid source of heat and the carbon containing solid residue of pyrolysis from said pyrolysis gases;

(b) contacting the resulting solids free pyrolysis gases with a solid hydrogen chloride acceptor containing a calcium compound selected from the group consisting calcium carbonate, calcium oxide, calcium hydroxide, calcium bicarbonate and mixtures thereof in a hydrogen chloride removal zone maintained at a temperature above the dew point of the pyrolysis gases to form a spent hydrogen chloride acceptor, formed by reaction of the hydrogen chloride with the hydrogen chloride acceptor, having calcium chloride at the surface thereof and a pyrolysis gases residue;

(c) recovering pyrolytic oil from the pyrolysis gases residue; and (d) removing said calcium chloride from said spent acceptor by washing the calcium chloride from the surface to form an aqueous solution of calcium chloride.

2. A process as claimed in claim 1 in which the hydrogen chloride removal zone is maintained at a temperature from 400° to about 1600° F.

3. In a process for the pyrolysis of solid organic wastes which includes solid organic wastes which yield hydrogen chloride upon pyrolysis wherein dried, comminuted solid organic waste, a solid source of heat and a carrier gas which is nondeleteriously reactive with respect to pyrolysis products are combined and passed through a pyrolysis zone maintained at a temperature from about 600° to about 2000° F. to form pyrolysis products which comprise the solid source of heat, a carbon containing solid residue of pyrolysis, pyrolysis gases comprising a condensable pyrolytic oil and a gaseous component which includes water, hydrogen chloride, and hydrocarbons, the method of recovering a pyrolytic oil and a gaseous residue substantially free of hydrogen chloride which comprises:

(a) separating the solid source of heat and the carbon containing solid residue of pyrolysis from said pyrolysis gases;

(b) contacting the resulting solids free pyrolysis gases with a solid material containing a calcium compound selected from the group consisting of calcium oxide, calcium carbonate and mixtures thereof in a hydrogen chloride removal zone maintained at a temperature above the dew point of the pyrolysis gases to convert a portion of the calcium compound to calcium chloride and yield a pyrolysis gases residue, said calcium chloride being formed on the surface of the solid material;

(c) recovering pyrolytic oil from the pyrolysis gases residue;

(d) treating the solid material to remove calcium chloride from the surface thereof to expose unreacted calcium compound for separation of hydrogen chloride by washing the calcium chloride from the surface to form an aqueous solution of calcium chloride; and (e) recycling said treated solid material to the hydrogen chloride removal zone.

4. A process as claimed in claim 3 in which the solid material containing a calcium compound is dolomite.

5. A process as claimed in claim 3 in which:

(a) the aqueous solution of calcium chloride is dehydrated;

(b) the calcium chloride is contacted with steam and carbon dioxide at an elevated temperature and pressure to yield calcium carbonate and hydrogen chloride;

(c) the calcium carbonate is recycled to the hydrogen chloride removal zone; and (d) the hydrogen chloride is recovered as a concentrated acid.

6. A process as claimed in claim 3 in which the hydrogen chloride removal zone is maintained at a temperature from about 400° to about 1600° F.

7. The process of claim 4 wherein said dolomite is calcined.

* * * * *